Figure 1:
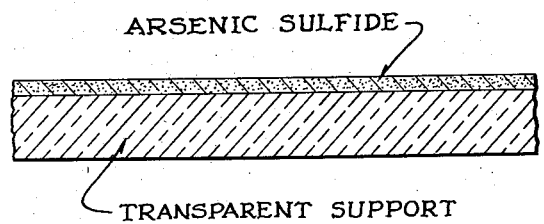
Figure 2:
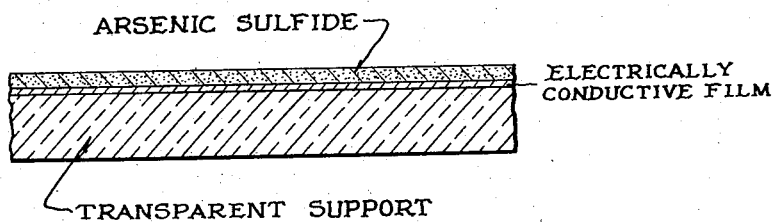

July 22, 1958     H. SCHLOSSER     2,844,493

HIGH RESISTANCE PHOTOCONDUCTOR

Filed Feb. 11, 1955

INVENTOR

HERBERT SCHLOSSER

BY *Lawrence J. Field*

ATTORNEY

United States Patent Office 2,844,493
Patented July 22, 1958

2,844,493
HIGH RESISTANCE PHOTOCONDUCTOR

Herbert Schlosser, Cleveland Heights, Ohio, assignor to Horizons Incorporated

Application February 11, 1955, Serial No. 487,691

12 Claims. (Cl. 117—211)

This invention relates to a novel photoconductive material possessed of an outstanding combination of physical properties. More particularly it relates to combinations of arsenic and sulfur, and preferably the compound $As_2S_3$ as photoconductive materials.

Recent activity in the field of photooconductive television pick-up tubes, electrostatic photography and electrostatic printing has heightened the interest in high resistance photoconductive materials. Among the photoconductive materials which have heretofore been used preferentially are elemental amorphous selenium, antimony trisulfide, zinc sulfide and zinc-cadmium sulfide. Each of these materials has been found to be of limited applicability because of one or more unsatisfactory characteristics. Thus, although each of these materials has an extremely high resistivity in the dark, generally of the order of $10^{12}$ ohm centimeters, and a resistance decrease factor of about 100 or more when illuminated, some limitation in each material serves as a deterrent to its widespread use in photoconductive image-viewing tubes and in electrostatic photographic devices.

I have now discovered a high resistance photoconductive material that appears to be free of the disadvantages inherent in prior art materials and possessing the following properties in a particularly advantageous combination which will be more fully discussed below:

(1) High resistivity
(2) Transparency to visible light
(3) Sharp peak of spectral response
(4) Uniformity of deposition
(5) Low temperature of evaporation
(6) Rate of evaporation
(7) Film thickness
(8) Absence of a history effect

(1) High resistivity

One of the most significant properties of any photoconductive material to be used in electrostatic photographic processes is the ability of the photoconductive material to retain a charge. The greater the charge that the material may hold, the greater the possibilities for contrast in a light and shadow visual image development from a latent electrostatic image in the photoconductive material. I have found that arsenic-sulfur compositions, and particularly arsenic trisulfide possess a dark resistivity at least as high as $10^{12}$ ohm centimeters and I have repeatedly imparted charges as high as 300–400 volts successfully to layers of my novel photoconductive material.

(2) Transparency to visible light

The novel photoconductive materials constituting my invention possess one outstanding characteristic which distinguishes them from virtually all prior art photoconductive materials, namely the ability to transmit visible light when in the form of relatively thick layers. It will be apparent that many potential applications exist in which it is desired to protect visible light through a photoconductive material. For example, a photoconductive plate including a layer of my novel photoconductive material is processed in a manner known in the art to form a visual image developed from a latent electrostatic image. Then the plate bearing the visual image is subjected to uniform illumination from one side. By virtue of the transparency of the photoconductor, the image may be projected onto a screen and there viewed. Since my novel material is transparent, it may be employed in films of comparatively great thickness without preventing such observation, whereas prior art photoconductive materials could only be employed in the form of extremely thin films.

(3) Sharp peak of spectral response

Another advantage possessed by my material is the fact that it has a spectral response which peaks sharply when excited by light having a mean wave length of about 4250 Angstrom units. This is in marked contrast with zinc sulfide which is excited primarily by light in the ultra violet band and other sulfides which respond primarily to visible light of the longer wave lengths. The peak response of $As_2S_3$ at about 4250 Angstrom units makes it particularly suitable for photographing a trace on a P-11 cathode ray tube, the light output of which is complementary to the response of $As_2S_3$.

(4) Uniformity of deposition

One of the most generally employed methods of producing photoconductive films of the prior art materials such as zinc sulfide, zinc-cadmium sulfide, and elemental amorphous selenium is to deposit the material on a suitable substrate by vacuum deposition. Generally, the material, contained in a carbon or porcelain boat, is heated in a vacuum to a temperature at which it vaporizes and the vapors are condensed on a solid plate of metal, conducting glass or plastic as the case may be. Many of the disadvantages found in the prior art photoconductive materials are associated with the vacuum deposition operation. Thus, when complex materials such as composites of zinc sulfide and cadmium sulfide are employed, the two constituents evaporate at different rates and temperatures and hence, deposits are generally non-uniform. The arsenic-sulfur materials which constitute my novel photoconductor are not subject to this disadvantage even when the relative proportions of arsenic and sulfur are varied somewhat from the optimum corresponding to the compound $As_2S_3$, because in practice the arsenic, sulfur and arsenic trisulfide all tend to deposit simultaneously under the specific temperature and vacuum employed.

(5) Low temperature of evaporation

When evaporating onto substrates which have been prepared with rigidly controlled dimensions, the amount of possible distortion produced by the deposition is in direct relation to the deposition temperature. Thus, a material which deposits at fairly low temperatures is preferable to one which deposits at higher temperatures. Approximate temperatures at which various photoconductive materials are vacuum deposited are tabulated below:

| Material: | Temperature, ° C. |
|---|---|
| Se | 250 |
| $As_2S_3$ | 300 |
| ZnS | 950 |
| ZnS–CdS | 900 |

Unlike selenium, the temperature range in which suitable films may be deposited is relatively broad, whereas in the case of selenium, because of the equilibrium between the amorphous and crystalline phases, only a narrow range of deposition temperatures has been found to be satisfactory.

(6) Rate of evaporation

Many of the prior art photoconductive compositions, particularly zinc-cadmium sulfides, zinc sulfide and elemental selenium, have been found to be sensitive to the temperature at which vacuum deposition is effected. That is, the photoconductive properties vary widely according to the temperature of deposition. Indeed, for selenium only a very narrow temperature has been found to be satisfactory.

It has also been observed that the photoconductive properties of such materials are noticeably affected by the rate of evaporation. Experiments with the arsenic-sulfur compositions of my invention indicate that within fairly broad limits the photoconductive properties are independent of both the temperature of evaporation and the rate of evaporation. Accordingly, photoconductive films with uniform properties which are readily reproducible are obtainable when employing the photoconductive materials of this invention.

(7) Film thickness

When photoconductive films are employed in the manner previously indicated, the limiting film thickness for maximum sensitivity is determined by the effective range of the carriers formed when the layer is illuminated. Unlike photoconductive materials heretofore known, it has been found that the sensitivity of my novel photoconductors is substantially independent of the film thickness up to thicknesses of 50 microns, presumably because of a much greater range possessed by the carriers. This is a decided advantage since evaporating conditions cannot always be controlled so as to produce a film within the narrow optimum range of thicknesses required by prior art materials. Furthermore, it is generally recognized that the thicker the film of photoconductive material, up to the limiting film thickness, the greater the charge which can be held. Thus the relatively thick films, possible with my novel photoconductive materials, are admirably suited to applications such as electrostatic photography where higher charges make possible greater contrast in the ultimate visual image produced.

(8) Absence of a history effect

Another disadvantage commonly associated with prior art photoconductive materials is the variation in such properties as the dark decay rate and the light sensitivity from specimen to specimen. One explanation for such variations is the prior history of the material. I have found that arsenic-sulfur compositions are relatively free from this defect.

In order that the advantages of my novel photoconductor may be more fully apparent, the following example of a preferred embodiment is appended by way of illustration.

EXAMPLE

Arsenic sulfide corresponding to the compound $As_2S_3$ was prepared in the following manner. Metallic arsenic was purified by distillation. The so-purified arsenic was dissolved in nitric acid, and the solution was then treated with excess hydrogen sulfide. The flocculent yellow orange precipitate was separated by filtration, washed and dried. The precipitate was heated in an inert atmosphere to drive off any excess sulfur.

The arsenic sulfide was placed in a refractory boat and positioned in a bell jar provided with suitable connections to a vacuum pump and with means for heating the boat. After the system was pumped down to a vacuum of $0.02\mu$, the boat was heated to effect the deposition of the arsenic sulfide on a clean glass plate previously coated with a transparent conducting layer positioned about 4" from the boat. At temperatures in the range of 250–450° C., a satisfactory deposit was obtained. Ordinarily the films are obtained in thicknesses between 1 and $50\mu$. As previously noted, the sensitivity does not appear to be adversely affected by thicknesses within the foregoing limits. The distillation deposited material in thicknesses greater than about 1 micron exhibits the properties of a "hole-type" conductor.

The properties of the photoconductive film prepared in the above manner, were investigated and it was found that the spectral response of this material was a maximum at 4250 Angstrom units.

While in the above example photoconductive composition corresponding to the compound $As_2S_3$ has been specified, I have found that other compositions in which the ratio of arsenic to sulfur varies between equimolar proportions of As to S and a molar ratio of 1 mol of As to 5 mols of S, possess the desired photoconductivity.

In addition to compositions comprised solely of arsenic and sulfur, compositions to which antimony, bismuth, lead, tellurium and tin or oxides or sulfides of these elements have been added, have been prepared. It has been found that such additions result in an increase in sensitivity in the photoconductive material, without an accompanying detrimental effect to the other properties.

As illustrative of such compositions, various amounts of $As_2O_3$ up to 10% by weight have been added to $As_2S_3$ with marked increase in the sensitivity of the product. The addition may be effected in any suitable fashion. For example, small amounts of $As_2O_3$ may be added directly to the $As_2S_3$, either before, or during, or after the formation of the photoconductor into the desired film. Alternatively, the previously described formation of $As_2S_3$ can be carried out under slightly oxidizing conditions, in which event, the freshly formed precipitate will contain small amounts of $As_2O_3$. Still another method I have found practicable is to subject the film of $As_2S_3$ to an oxidizing atmosphere such as air, or even pure oxygen gas, at somewhat elevated temperature, whereby some $As_2O_3$ is formed in the layer. Combinations of these methods may also be employed. Whichever method is chosen, the resulting photoconductor was found to have an increased sensitivity.

Another method of increasing the sensitivity of my novel photoconductive compositions which has been found to produce a substantial increase in the sensitivity consists in subjecting the photoconductor to a heat treatment, at temperatures between about 300° F. and 500° F. and preferably at temperatures of about 400° F. The improved properties have been produced by heating in various gases such as air, oxygen and even hydrogen. I prefer to carry out the heat treatment in conjunction with an oxidation step whereby the benefits of both treatments may be obtained together. I have found that the photoconductor should not be exposed to high temperatures for too long a time since peeling and cracking of the photoconductor may be produced. Exposures of between one-half hour and one hour have been found to produce the improvements, although treatments for periods up to sixteen hours have been used effectively.

In the attached sheet of drawings there is shown in diagrammatical section a preferred embodiment of two forms in which my photoconductive materials may be employed.

I claim:

1. A transparent light sensitive assembly composed of a support and a coating thereon consisting of a photoconductive material having a resistivity in the dark of the order of $10^{12}$ ohm centimeters and a resistance decrease factor of at least about 100 when illuminated, said coating consisting essentially of a composition of arsenic and sulfur in which the relative proportion of arsenic to sulfur is greater than 1 mol of arsenic:5 mols of sulfur and less than equimolar.

2. A transparent light sensitive assembly composed of a support and a coating thereon consisting of a photoconductive material having a resistivity in the dark of the order of $10^{12}$ ohm centimeters and a resistance decrease factor of at least about 100 when illuminated, said coating consisting essentially of a composition of arsenic and sulfur in the relative proportions of about 2 mols of arsenic to 3 mols of sulfur.

3. A transparent light sensitive assembly adapted to receive and to retain an electrostatic charge for a substantial interval of time, and comprising a transparent support carrying a transparent film of between 1 and 50 microns in thickness and consisting of $As_2S_3$.

4. A transparent light sensitive assembly adapted to receive an electrostatic charge and to retain said charge for a substantial interval of time, and comprising a transparent support bearing an electrically conductive layer on one surface thereof, and deposited thereon, a transparent photoconductive layer consisting of arsenic trisulfide.

5. A transparent light sensitive assembly having an enhanced sensitivity and consisting of a transparent support bearing an electrically conductive layer on one surface thereof and superimposed thereon, a transparent photoconductive layer consisting of arsenic trisulfide containing up to 10% by weight of arsenic oxide.

6. As a transparent photoconductive assembly, a transparent supporting substrate, an electrically conductive coating supported on one surface thereof and a photoconductive layer disposed on said electrically conductive coating and comprising a layer consisting essentially of arsenic sulfide and having a dark resistivity of at least 10 ohm cm. and a resistance decrease factor of at least about 100 when illuminated.

7. The article of claim 6 in which the transparent layer of arsenic sulfide is a uniform film deposited on the support by condensation from a vapor, and possessing a thickness of between 1 and 50 microns.

8. A photoconductive material consisting essentially of compounds composed entirely of arsenic and sulfur in which the molar proportion of arsenic to sulfur is between 1:1 and 1:5 and including in addition a small but effective amount of a material from the class consisting of antimony, bismuth, lead, tellurium and tin, and the oxides and sulfides of antimony, bismuth, lead, tellurium and tin.

9. A photoconductive element of increased sensitivity comprising a support and disposed thereon as a coating, a film consisting of $As_2S_3$ which has been subjected to an oxidizing atmosphere for one hour, at a temperature between 300° F. and 400° F.

10. A process of improving the sensitivity of a supported photoconductive film of $As_2S_3$ which comprises subjecting the film consisting to a heat treatment between 300° F. and 500° F.

11. A process of improving the sensitivity of a supported photoconductive film of $As_2S_3$ which comprises subjecting the film consisting to a heat treatment between 300° F. and 500° F. for one hour.

12. A process of improving the sensitivity of a supported photoconductive film of $As_2S_3$ which comprises subjecting the film consisting to a heat treatment between 300° F. and 500° F. for one hour in an oxidizing atmosphere.

References Cited in the file of this patent

UNITED STATES PATENTS

| | | |
|---|---|---|
| 1,601,607 | Wein | Sept. 28, 1926 |
| 2,079,477 | Asao et al. | May 4, 1937 |
| 2,401,736 | Janes | June 11, 1946 |
| 2,431,401 | Janes | Nov. 25, 1947 |
| 2,491,199 | Mulder | Dec. 13, 1949 |
| 2,654,852 | Goodrich | Oct. 6, 1953 |
| 2,692,178 | Grandadam | Oct. 19, 1954 |
| 2,692,836 | McAuley | Oct. 26, 1954 |
| 2,765,240 | Land | Oct. 2, 1956 |

OTHER REFERENCES

Concise Chem. and Tech. Dictionary (Bennett), 1947, p. 75.

Rekalova: "Photoconductivity of Auripigment $As_2S_3$ Strong Electric Fields," Zhur, Tekh. Fiz. 21, 1041–4 (1951), Chem. Abs., vol. 46, page 2916g.

UNITED STATES PATENT OFFICE

CERTIFICATE OF CORRECTION

Patent No. 2,844,493                                                                         July 22, 1958

Herbert Schlosser

It is hereby certified that error appears in the printed specification of the above numbered patent requiring correction and that the said Letters Patent should read as corrected below.

Column 5, line 29, for "10" read -- $10^{12}$ --; column 6, line 11, claim 10, strike out "consisting" and insert the same after "film" in line 10; line 15, claim 11, strike out "consisting" and insert the same after "film" in line 14; line 19, claim 12, strike out "consisting" and insert the same after "film" in line 18.

Signed and sealed this 21st day of October 1958.

(SEAL)
Attest:

KARL H. AXLINE
Attesting Officer

ROBERT C. WATSON
Commissioner of Patents